United States Patent [19]

Euson

[11] Patent Number: 4,650,003
[45] Date of Patent: Mar. 17, 1987

[54] LIGHT PATH HEAT DETECTOR

[75] Inventor: Thomas G. Euson, Indianapolis, Ind.

[73] Assignee: Systecon Inc., Cincinnati, Ohio

[21] Appl. No.: 721,580

[22] Filed: Apr. 10, 1985

[51] Int. Cl.$^4$ .............................................. A62C 37/18
[52] U.S. Cl. ..................................... 169/60; 239/691;
250/227; 250/554
[58] Field of Search ................ 250/227, 554; 340/577,
340/578, 590; 350/96.1; 374/161; 169/54, 60,
61; 239/691

[56] References Cited

U.S. PATENT DOCUMENTS

| Re. 25,727 | 2/1965 | Haluska ........................... 260/448.2 |
|---|---|---|
| 2,719,098 | 9/1955 | Goldman ............................ 117/124 |
| 3,051,038 | 8/1962 | Duke .................................. 88/22.5 |
| 3,208,342 | 9/1965 | Nethercot, Jr. ........................ 88/61 |
| 3,262,810 | 7/1966 | Campbell ............................ 117/126 |
| 3,389,114 | 6/1968 | Burzynski et al. ................. 260/32.8 |
| 3,451,838 | 6/1969 | Burzynski et al. ................. 117/33.3 |
| 3,460,980 | 8/1969 | Burzynski ............................ 117/132 |
| 3,492,493 | 1/1970 | Herriott et al. ..................... 250/227 |
| 3,609,731 | 9/1971 | Evans ............................... 340/227 C |
| 3,625,589 | 12/1971 | Snitzer ........................... 350/96 WG |
| 3,626,758 | 12/1971 | Stewart et al. .................... 73/355 R |
| 3,819,250 | 6/1974 | Kibler ............................... 350/96 R |
| 3,841,731 | 10/1974 | Midwinter ..................... 350/96 WG |
| 3,933,678 | 1/1976 | Graham ............................. 252/300 |
| 3,944,811 | 3/1976 | Midwinter ......................... 250/199 |
| 3,960,017 | 6/1976 | Romanowski .......................... 73/39 |
| 3,990,518 | 11/1976 | Hemme .......................... 340/577 X |
| 4,016,761 | 4/1977 | Rozzell et al. ....................... 73/356 |
| 4,114,981 | 9/1978 | Ishida et al. ..................... 350/96.33 |
| 4,117,460 | 9/1976 | Walworth et al .................... 340/190 |
| 4,136,566 | 1/1979 | Christensen ......................... 73/356 |
| 4,151,747 | 5/1979 | Gottlieb et al. ................... 73/339 R |
| 4,159,420 | 1/1979 | Tsunoda ............................. 250/227 |
| 4,179,927 | 12/1979 | Saaski ................................. 73/350 |
| 4,201,446 | 5/1980 | Geddes et al. .................... 350/96.29 |
| 4,203,326 | 5/1980 | Gottlieb et al. ................... 73/339 R |
| 4,228,761 | 10/1980 | Glover et al. ....................... 116/201 |
| 4,270,840 | 6/1981 | Uchida et al. .................... 350/96.34 |
| 4,278,349 | 7/1981 | Sander ................................. 356/44 |
| 4,288,159 | 9/1981 | Newman .............................. 356/44 |
| 4,295,739 | 10/1981 | Meltz et al. .......................... 356/43 |
| 4,298,794 | 11/1981 | Snitzer et al. ....................... 250/227 |
| 4,302,970 | 12/1981 | Snitzer et al. .................... 73/339 R |
| 4,316,388 | 2/1982 | Miller et al. ......................... 73/356 |

(List continued on next page.)

FOREIGN PATENT DOCUMENTS

| 54-8542 | 6/1977 | Japan . |
|---|---|---|
| 886683 | 1/1962 | United Kingdom . |
| 887755 | 1/1962 | United Kingdom . |
| 1134027 | 11/1968 | United Kingdom . |
| 1184028 | 3/1970 | United Kingdom . |
| 1438961 | 6/1976 | United Kingdom . |
| 1527519 | 10/1978 | United Kingdom . |
| 1582768 | 1/1981 | United Kingdom . |

OTHER PUBLICATIONS

W. F. Yeung & A. R. Johnston, "Effect of Temperature on Optical Fiber Transmission:", Dec. 1978, pp. 3703–3705.
C. Yeh & A. Johnston, "How Does One Induce Leakage in an Optical Fiber Link?", May 1977, pp. 26.1–26.5.
"Review of NASA Fiber Optics Tasks", Agard Conf. Proc. N219, London, May 1977, pp. 6.6 and 6.14.
M. Gottlieb & G. B. Brandt, "Measurement of Temperature with Opitcal Fibers Using Transmission Intensity Effects", Oct. 1978.
M. Gottlieb & G. B. Brandt, "Non-Interferometric Measurement of Temperature with Optical Fibers", Oct. 17, 1978.
Strub, "Material for Making Resilient Light Pipes to be Mounted Without Silicon Grease", Oct. 1964, p. 1268.
"Communications and Microwave Technology", IEEE Spectrum, Jan. 1977, pp. 43–48.

Primary Examiner—Eugene R. LaRoche
Assistant Examiner—James C. Lee
Attorney, Agent, or Firm—Wood, Herron & Evans

[57] ABSTRACT

An apparatus for detecting an increase in heat is provided which utilizes a light path such as a fiber optic cable which is coupled between a light source and a light detector. The fiber optic cable has predetermined light transmission characteristics which are changeable in response to an increase in heat in the vicinity of the cable. As a result, the amount or frequency of light detected by the light detector will change in response to the increase in heat. The apparatus is also described in connection with an electrostatic paint spray system.

26 Claims, 2 Drawing Figures

U.S. PATENT DOCUMENTS

| | | | |
|---|---|---|---|
| 4,342,907 | 8/1983 | Macedo et al. | 250/227 |
| 4,370,020 | 1/1983 | Davey | 350/96.1 |
| 4,373,768 | 2/1983 | Clarke | 350/96.34 |
| 4,379,289 | 4/1983 | Peek | 250/227 X |
| 4,388,267 | 6/1983 | Tokarz | 340/590 |
| 4,417,782 | 11/1983 | Clarke et al. | 350/96.29 |
| 4,418,338 | 11/1983 | Burt | 340/578 |
| 4,427,263 | 1/1984 | Lagakos et al. | 350/96.33 |
| 4,431,264 | 2/1984 | Clarke | 350/96.34 |
| 4,432,606 | 1/1984 | Blair | 350/96.33 |
| 4,437,761 | 3/1984 | Kroger et al. | 356/44 |
| 4,443,698 | 4/1984 | Schiffner | 250/227 |
| 4,461,536 | 7/1984 | Shaw et al. | 350/96.15 |
| 4,482,205 | 11/1984 | Lagakos et al. | 350/96.34 |
| 4,488,040 | 11/1984 | Rowe | 250/227 |
| 4,505,542 | 3/1985 | Clarke | 350/96.33 |
| 4,508,461 | 4/1985 | Lambert | 374/161 |
| 4,515,474 | 5/1985 | Fox | 356/44 |
| 4,532,499 | 7/1985 | Collin et al. | 250/227 X |

LIGHT PATH HEAT DETECTOR

BACKGROUND OF THE INVENTION

I. Field of the Invention

The present invention relates to an apparatus for detecting increases in heat, particularly for detecting dangerous increases in heat caused by conditions such as by fire, spontaneous combustion, or the like, in a high-voltage environment such as an electrostatic spray paint system.

II. Description of the Prior Art

Typical apparatus for detecting increases in heat such as would indicate a fire, spontaneous combustion, or a like condition are employed in fire suppression systems to suppress the condition causing the increased heat. For example, in an electrostatic spray paint environment, it is sometimes possible for the paint in the painting area, or booth, to catch fire or to spontaneously combust. In that event, it is necessary to suppress the condition by immediately expelling a fire suppressing material into the zone of increased heat. Typical suppressing materials would be Halon 1301, dry chemical, carbon dioxide, and foam.

With particular reference to electrostatic spray paint systems, there is a recognized risk of fire, especially in the vicinity of the spray paint nozzle from which the paint is emitted. In such systems, the nozzles are raised in potential to several thousands of volts. As a result, the paint which is emitted from the nozzles is thus highly charged. Because of the high charge concentrations and large voltages involved, the use of electrically conducting heat detectors in the vicinity of the nozzle has been avoided. Accordingly, either nonelectrically conductive heat detectors have been employed near the nozzle, and/or electrically conductive detectors have been utilized at a location remote from the nozzle. Such previous heat detectors suffered several drawbacks.

One such detector employs an infrared detector coupled to an electronic circuit which circuit controls expulsion of the fire suppressing materials. The detector would typically be placed above the area of active spray painting and the detector's line of sight directed toward the center of that spraying area. In the event of a fire, for example, the amount of infrared light sensed by the detector would increase. The electronic circuit detects the increase and if the increase is sufficiently large to indicate a dangerous condition, the electronic circuit would initiate fire suppression techniques such as the expelling of the suppressing materials. One drawback to such a detector is that it is remote from the nozzle and hence may not detect a dangerous increase in heat at the nozzle sufficiently quick to permit suppression of the condition before damage to the equipment or risk to humans is unavoidable. Further, such a detector is too bulky to be placed near the nozzle. Moreover, even if such placement were easily accomplished, the field of view or line of sight, of the detector is too limited. Hence, a dangerous increased heat condition could go undetected for too long a period of time. An additional drawback of such a system is that it is subject to the effects of ambient light. For example, some portions of the electrostatic spray paint systems may be contained within a dark booth or cabinet. Entering the booth for servicing or any other reason will require opening an accessway which will likely permit light to enter. In response to the light, the electronic circuit will undesirably initiate the fire suppression techniques.

An alternative type of heat detector utilizes a pressurized hose or tube. For example, a length of nylon or vinyl hose is pressurized with nitrogen. In the event that the heat increase is sufficient to melt or otherwise break down the hose material, the nitrogen within the hose will escape causing a sudden drop in pressure. The drop in pressure may act to mechanically release or open a valve thereby actuating the fire suppression techniques. Alternatively, a transducer situated in a circuit including the pressurized line and coupled to the electronic circuit could sense the drop in pressure. The electronic circuit which is responsive to the transducer initiates the above fire suppression techniques. The pressurized hose approach may be employed to detect increased heat conditions near the nozzle as the pressurized hose comprises an electrically non-conductive detector.

The use of pressurized hose also has drawbacks, however. One problem with the pressurized hose approach is that the system is prone to air leaks which look to the electronic circuit as through it were a dangerously-increased heat condition. There are also additional drawbacks in specific applications For example, there is a strong move in the electrostatic spray paint industry towards robotics. A robotically-controlled arm carries paint lines to a spray paint nozzle which is movably supported at the free end of the arm. The nozzle and arm may move in a variety of directions to permit complete paint coverage of the object to be painted. Due to the wide variety of movements possible, a large volume of space must be monitored for fire and the like. To provide adequate detection over the entire vicinity of interest, it is necessary that a portion of the pressurized hose be attached to the structure of the robot arm as well as having a portion spaced adjacent the spray paint nozzle so as to ensure that the detector is always located near the most likely sources of fire. In such a system, the air leak problem with pressurized hose is aggravated. Specifically, the diversity of movements of the arm and the nozzle may tend to induce leaks in the pressurized hose. Additionally, certain space constraints imposed in a robotic system may be too severe to permit use of pressurized hose. Typical pressurized hose is at least $\frac{1}{4}$ inch in diameter and in the robot arm environment, there may not be sufficient space to accommodate the hose.

SUMMARY OF THE INVENTION

The apparatus provided by the present invention is believed to overcome the above drawbacks. Specifically, with the apparatus of the present invention, heat may be detected without limitation due to the field of view of an infrared detector and without effects due to ambient light. Further, increases in heat may be detected with the apparatus of the present invention without relying exclusively on air pressure.

With respect to the electrostatic spray paint environment, the present invention is believed to provide an apparatus for detecting dangerous increases in heat without the use of electrically conducting wires adjacent the spray paint nozzle. Further apparatus according to the present invention provides for such detection without limitations due to field of view of an infrared detector and without relying exclusively on air pressure. Finally, in the electrostatic spray paint environment, the present invention is believed to provide an apparatus for detecting an increase in heat which not only does not have the above drawbacks, but which can be attached to a robot arm and spaced adjacent a spray paint nozzle irrespective of the variety of movements thereof.

Thus, in accordance with the present invention and in its broadest aspects, an apparatus for detecting an increase in heat is provided in which heat detection is accomplished by a light path such as a fiber optic cable having predetermined light transmission characteristics for transmitting light therealong wherein the light transmission characteristics are changeable in response to an increase in heat in the vicinity of the fiber optic cable. A light source is coupled to a light detector by the fiber optic cable wherein the amount or frequency of light detected by the light detector from the light source is dependent on the light transmission characteristics of the cable. Thus, the amount or frequency of light detected will change in response to the increase in heat by virtue of the change in light transmission characteristics of the cable.

In one embodiment, the light transmission characteristics of the cable will change due to deformation of the cable such as melting or breaking caused by an increase in heat. Alternatively, the fiber optic cable may be surrounded by a material which prevents dispersion of some of the light as it travels along the fiber optic cable. The material is adapted to expose portions of the cable in response to the increase in heat such as by melting whereby a portion of the light travelling along the cable is permitted to disperse out of the cable thus resulting in a reduced amount of light arriving at the detector.

With respect to an electrostatic spray paint system, the above-described heat detecting apparatus may be employed wherein a portion of the fiber optic cable is spaced adjacent the spray paint nozzle and wherein the light source and the light detector are spaced away from the spray paint nozzle. In the electrostatic spray paint system, there is further provided a fire suppression system which is responsive to the light detector for suppressing a dangerous increased heat condition. In those applications in which the spray paint nozzle is moveable, the portion of fiber optic cable mounted therewith is also moveable. In a preferred embodiment in which the spray paint nozzle is movably secured to the free end of a movable structure such as a robot arm or the like, a further portion of the fiber optic cable is attached to the movable structure.

The foregoing apparatus for detecting an increase in heat is believed to overcome the drawbacks of prior detectors while advantageously providing a reliable means of detecting such increases in heat. Further, because the apparatus includes its own light source and light detector, it is not subject to a limited field of view of an infrared detector nor to the effects of ambient light. Further, because the detecting mechanism is light, the apparatus of the present invention does not rely for proper operation exclusively on air pressure. Also, with the use of typically thin fiber optic cable, there is sufficient space to attach the apparatus of the present invention, at least the operative portions such as the cable, to the arm of a robot and to run the cable adjacent the spray paint nozzle. Finally, the use of fiber optic cable eliminates the danger presented by electrically conducting cable without the risk of failure such as would be present with pressurized hose.

BRIEF DESCRIPTION OF THE DRAWINGS

These and other features of the invention will become more readily apparent from the following detailed description taken with the accompanying drawings in which.

DETAILED DESCRIPTION OF THE DRAWINGS

Figure 1:
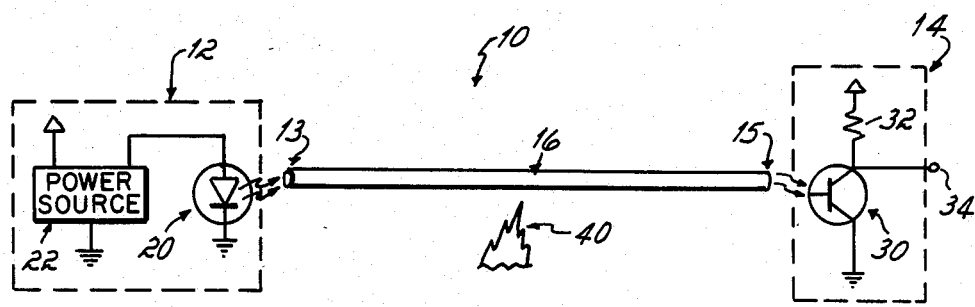
FIG. 1 is a schematic illustration of an apparatus for detecting heat according to the principles of the present invention.

With reference to FIG. 1, there is shown a schematic illustration of an apparatus 10 for detecting an increase in heat such as caused by a fire, spontaneous combustion, or a like condition in accordance with the principles of the present invention. Apparatus 10 includes a light source 12 and a light detector 14 coupled by a light path 16 which is preferably a fiber optic cable. Fiber optic cable 16 may be of any suitable material such as glass or plastic.

Glass fiber optic materials and methods of their preparation are described in U.S. Pat. Nos. 2,825,260; 2,992,587; 3,589,739; 3,625,669; 3,626,040; and 3,742,731. Plastic fiber optic materials such as an acrylic plastic monofilament core with a polymer cladding are available from Du Pont Co., Wilmington, Del., and is referred to as CLOE grade fiber.

Light source 12 includes a light-emitting diode 20 which is driven by a power source 22. Power source 22 may be either a DC power source or an AC power source as may be desired by the user and as determined by the constraints of whatever electronic circuit (not shown) is employed. Note that the electronic circuit (not shown) is to be responsive to light detector 14. When energized, light-emitting diode 20 emits light which may be in the visible spectrum or some other range as desired. For example, the light emitted may be ultraviolet or infrared.

Light-emitting diode 20 is coupled to one end 13 of cable 16 in conventional manner such as by a lens and/or connector (neither shown). Light detector 14, which is similarly coupled to end 15 of cable 16 by conventional means, includes a photodetector transistor 30. For illustrative purposes, transistor 30 has been shown to have its base unconnected to any power supply, its emitter grounded and its collector resistively coupled via resistor 32 to a source of power such as power source 22. Other biasing arrangements may be employed as desired. Photodetector transistor 30 and light-emitting diode 20 are conventional semiconductor devices and each may be configured in a variety of manners as is well-known.

Fiber optic cable 16 has predetermined light characteristics which affect the propagation and/or dispersion of the light as it travels along cable 16. Exemplary of those characteristics are refractive index and light conductance which can change as the cable deforms due to heat, for example. Also, the amount of light which can travel outside the cable may be varied by the presence of a coating (referred to herein as a "material") as is discussed in aforesaid U.S. Pat. No. 3,742,731 at Col. 5, Lines 1-21, which is incorporated herein by reference. This feature is similarly referred to herein as a light transmission characteristic.

In operation, the light emitted from light-emitting diode 20 is coupled to and passes through cable 16. The amount and/or frequency of light received by photodetector transistor 30 of light detector 14 is dependant on the light transmission characteristics of the cable 16. In normal operation, a predetermined amount of light at a predetermined frequency will thus be transmitted through cable 16 to detector 14. As a result, the output 34 of detector 14 will be at a certain voltage indicative of the amount of light passing through cable 16 as is well understood.

In the presence of an increase in heat such as due to a fire 40 in the vicinity of cable 16, the light transmission characteristics of cable 16 will change. For example, if fire 40 is sufficiently intense, cable 16 will melt or break apart. In the former, the amount (and/or the frequency) of light received by detector 14 will be reduced (or changed) thus changing the voltage on output 34. In the latter situation, the amount of light detected by detector 14 will drop to zero which will be indicated by a more dramatic change in voltage on output 34. An electronic circuit (not shown) coupled to output 34 of detector 14 monitors output 34. Thus, where there is an increase in heat in the vicinity of cable 16, the electronic circuit will detect same. Typically, a fire suppression system (not shown) will include the electronic circuit (not shown). If the increase in heat (change in voltage on output 34) is sufficient to indicate a dangerous condition, the fire suppression system will be activated.

Figure 2:
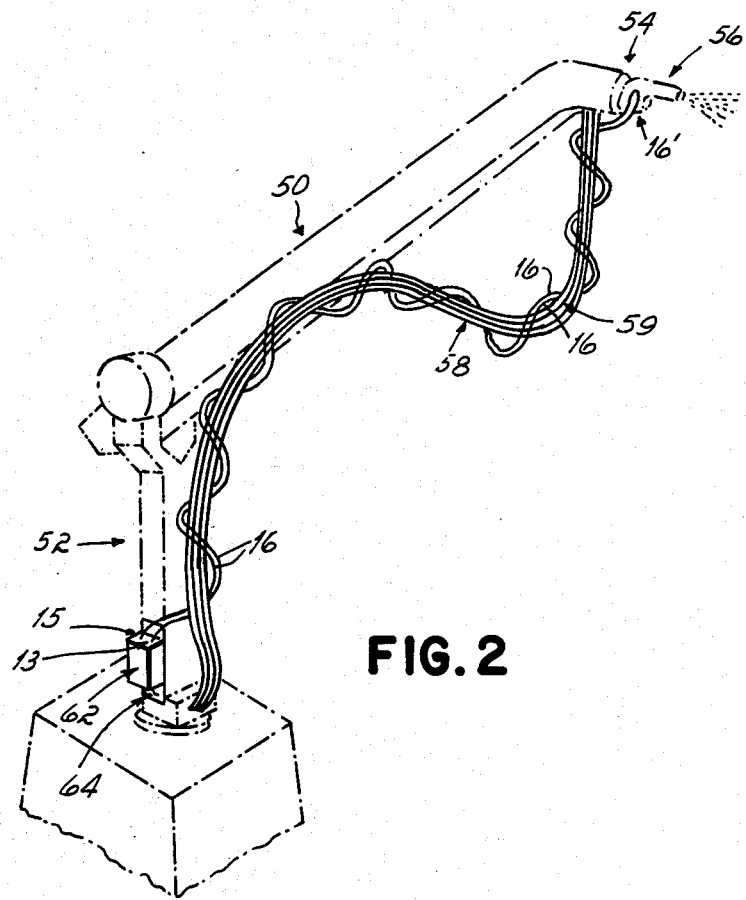
FIG. 2 is a perspective view of a robot arm of an electrostatic spray system which incorporates the apparatus of the present invention.

With reference to FIG. 2, there is shown a preferred application of the apparatus 10 of the present invention in the environment of an electrostatic spray paint system. The electrostatic spray paint system includes a robot arm 50 which is movable about a base 52 as is well known. Movably mounted to the free end 54 of the arm 50 is a spray paint nozzle 56. Running along arm 50 and base 52 are a plurality of paint lines 58 which are coupled to nozzle 56.

In accordance with the teachings of the present invention, there is further provided along the base 52 and arm 50 the fiber optic cable 16. In this embodiment of FIG. 2, fiber optic cable 16 is a long light path or circuit which begins and ends at a junction box 62. Accordingly, end 13 of cable 16 is coupled to box 62. The portion of cable 16 between ends 13 and 15 travels up along base 52, along arm 50, into nozzle 56, back along arm 50 and base 52 to box 62 whereat end 15 is also coupled to box 62. The portion of cable 16 in or near nozzle 56 is referred to as cable 16'. Cable 16 is preferably spirally wrapped around paint lines 58. This arrangement ensures that cable 16 is always positioned near the paint lines. Further, this arrangement minimizes the danger of breakage to cable 16 during the variety of movements of arm 50 and nozzle 56.

Junction box 62 includes the light source 12 and the light detector 14 as previously discussed. Junction box 62 is coupled electrically by lines 64 to an external source of power and to the electronic circuit (not shown).

In the system of FIG. 2, one of the paint lines 58 may be a fire suppression line 59 which carries therethrough one of the aforementioned fire-suppressing materials. The electronic circuit (not shown) is responsive to light detector 14 and in the event of an undue increase in heat, line 59 will be energized with the fire-suppressing material which will then be emitted at or near nozzle 56 to terminate the fire or the like which has caused the increased heat condition.

Due to that portion 16' of cable 16 which is spaced adjacent nozzle 56, it is possible to detect an increase in heat such as caused by fire or spontaneous combustion or the like in the vicinity of nozzle 56. Further, since cable 16 is wound about paint lines 58 as discussed, dangerous heat conditions in the vicinity of the arm may also be detected. Such detection can take place without limitation as to field of view of an infrared detector or without relying exclusively on air pressure.

With respect to the light transmission characteristics of fiber optic cable 16, as discussed, the characteristics will change by deformation or breaking thereof. Alternatively, cable 16 could be coated with a material (not shown) which material is adapted to melt or otherwise expose portions of cable 16 when the material is exposed to heat for reasons now to be explained.

Typical fiber optic cable 16 will tend to disperse some of the light as it travels therealong. The material surrounding cable 16 will prevent the loss of some of that light. When exposed to heat, a portion of the material may melt away thus permitting some of the light to escape from cable 16 as it traverses the cable. As a result, the amount of light detected by detector 14 will be reduced thus indicating an increase in heat in the vicinity of cable 16. The material (not shown) could be a coating applied directly to cable 16 or it could be a sheathing or tubing into which cable 16 has been inserted. Of course, both deformation characteristics of the fiber optic cable 16 and exposure from material removal could be employed in the detector of this invention.

Although initially conceived and designed for an electrostatic spray paint system, the apparatus of the present invention may be utilized to detect increases of heat in a number of environments. Accordingly, the invention is not limited to the electrostatic paint spray environment.

Having described the invention, what is claimed is:

1. An electrostatic spray paint system comprising:
   a spray paint nozzle;
   at least one paint line coupled to the spray paint nozzle and extending therefrom to carry paint to the spray paint nozzle,
   a light source spaced away from said spray paint nozzle for emitting an amount of light;
   a light detector spaced away from said spray paint nozzle for detecting light;
   a fiber optic cable having predetermined light transmission characteristics being changeable in response to a dangerous increased heat condition, such as fire, spontaneous combustion and the like, in the vicinity of said fiber optic cable, said fiber optic cable including a portion spaced adjacent said spray paint nozzle, and a further portion spaced adjacent said at least one paint line, said fiber optic cable further being connected between said light source and said light detector wherein the amount of light detected by said light detector from said light source is dependent on said light transmission characteristics, whereby said amount of ight detected will change in response to said dangerous increased heat condition;
   suppressing means responsive to said light detector for suppressing said dangerous increased heat condition.

2. In the system of claim 1, said spray paint nozzle being moveable, said adjacent portion of fiber optic cable being moveable therewith.

3. In the system of claim 2, said fiber optic cable being surrounded by a material, said material adapted to expose portions of said fiber optic cable in response to said increase in heat.

4. In the system of claim 2, said fiber optic cable deforming in response to said increase in heat.

5. In the system of claim 4, said fiber optic cable adapted to break apart in response to said increase in heat.

6. In the system of claim 2, said spray paint nozzle further being moveably secured to the free end of a moveable structure such as a robot arm or the like.

7. In the system of claim 6, said fiber optic cable being surrounded by a material, said material adapted to expose portions of said fiber optic cable in response to said increase in heat.

8. In the system of claim 6, said fiber optic cable deforming in response to said increase in heat.

9. In the system of claim 8, said fiber optic cable adapted to break apart in response to said increase in heat.

10. In the system of claim 6, wherein a further portion of said fiber optic cable is attached to said moveable structure.

11. In the system of claim 10, said fiber optic cable being surrounded by a material, said material adapted to expose portions of said fiber optic cable in response to said increase in heat.

12. In the system of claim 10, said fiber optic cable deforming in response to said increase in heat.

13. In the system of claim 12, said fiber optic cable adapted to break apart in response to said increase in heat.

14. An electrostatic spray paint system comprising:
a spray paint nozzle;
at least one paint line coupled to the spray paint nozzle and extending therefrom for carrying paint to the spray paint nozzle;
a light source spaced away from said spray paint nozzle for emitting light at at least one predetermined frequency;
a light detector spaced away from said spray paint nozzle;
a fiber optic cable having predetermined light transmission characteristics being changeable in response to a dangerous increased heat condition, such as fire, spontaneous combustion and the like, in the vicinity of said fiber optic cable, said fiber optic cable including a portion spaced adjacent said spray paint nozzle and a further portion spaced adjacent said at least one paint line, said fiber optic further being connected between said light source and said light detector wherein the frequency of light detected by said light detector from said light source is dependent on said light transmission characteristics, whereby said frequency of light detected will change in response to said dangerous increased heat condition;
suppressing means responsive to said light detector for suppressing said dangerous increased heat condition.

15. The system of claim 14, said spray paint spray nozzle being movable, said adjacent portion of fiber optic cable and said at least one paint line being movable therewith.

16. The system of claim 15, said fiber optic cable being surrounded by a material, said material adapted to expose portions of said fiber optic cable in response to said increase in heat.

17. The system of claim 15, said fiber optic cable deforming in response to said increase in heat.

18. The system of claim 17, said fiber optic cable adapted to break apart in response to said increase in heat.

19. The system of claim 15, said spray paint nozzle further being movably secured to the free end of a movable structure such as a robot arm or the like.

20. The system of claim 19, said fiber optic cable being surrounded by a material, said material adapted to expose portions of said fiber optic cable in response to said increase in heat.

21. The system of claim 19, said fiber optic cable deforming in response to said increase in heat.

22. The system of claim 21, said fiber optic cable adapted to break apart in response to said increase in heat.

23. The system of claim 19, wherein a second further portion of said fiber optic cable is attached to said movable structure.

24. The system of claim 23, said fiber optic cable being surrounded by a material, said material adapted to expose portions of said fiber optic cable in response to said increase in heat.

25. The system of claim 23, said fiber optic cable deforming in response to said increase in heat.

26. The system of claim 25, said fiber optic cable adapted to break apart in response to said increase in heat.

* * * * *

UNITED STATES PATENT AND TRADEMARK OFFICE
CERTIFICATE OF CORRECTION

PATENT NO. : 4,650,003
DATED : March 17, 1987
INVENTOR(S) : Thomas G. Euson

It is certified that error appears in the above-identified patent and that said Letters Patent is hereby corrected as shown below:

Column 2, line 24, after "applications" insert -- . --.

Column 6, line 60, "ight" should -- light --.

Column 8, line 2, before "further" insert -- cable --.

Signed and Sealed this

Fifteenth Day of September, 1987

*Attest:*

DONALD J. QUIGG

*Attesting Officer*      *Commissioner of Patents and Trademarks*